United States Patent
Mueller

(10) Patent No.: US 6,530,583 B1
(45) Date of Patent: Mar. 11, 2003

(54) WORK TOOL TRANSPORTING AND SUPPORT APPARATUS

(76) Inventor: Mark J. Mueller, W73 N1031 Poplar Ave., Cedarburg, WI (US) 53012

( * ) Notice: Subject to any disclaimer, the term of this patent is extended or adjusted under 35 U.S.C. 154(b) by 0 days.

(21) Appl. No.: 09/938,162

(22) Filed: Aug. 23, 2001

Related U.S. Application Data

(63) Continuation-in-part of application No. 09/571,433, filed on May 15, 2000, now Pat. No. 6,345,829.

(51) Int. Cl.$^7$ ................................................. B62B 1/00
(52) U.S. Cl. ............................... 280/47.18; 280/47.28; 269/17; 144/286.5; 83/477.1
(58) Field of Search ........................ 280/30, 651, 652, 280/47.131, 47.24, 47.28, 47.33, 47.27, 47.18, 47.2, 655, 655.1; 108/11, 15, 18; D34/12, 14, 26; 187/231; 182/20; 269/17; 144/286.1, 286.5

(56) References Cited

U.S. PATENT DOCUMENTS

| | | | |
|---|---|---|---|
| 795,147 A | 7/1905 | Magoffin | |
| 2,430,107 A | 11/1947 | Cronrath | 214/65 |
| 2,479,467 A | 8/1949 | Bryant | 280/36 |
| 2,784,004 A * | 3/1957 | Hamrick | 280/30 |
| 3,064,989 A * | 11/1962 | Bellows | 280/47.18 |
| 3,193,123 A * | 7/1965 | Wouden | 280/47.27 X |
| 3,684,307 A * | 8/1972 | Bourgraf et al. | 280/654 |
| 3,785,669 A | 1/1974 | Doheny | 280/47.18 |
| D249,032 S | 8/1978 | Tarran | D12/25 |
| 4,269,096 A | 5/1981 | Boone | 83/477.2 |
| 4,284,286 A | 8/1981 | Lewallen | 280/30 |
| D273,522 S | 4/1984 | Zastera | D34/17 |
| 4,457,527 A | 7/1984 | Lowery | 280/47.19 |
| 4,620,712 A | 11/1986 | Blackwell | 280/47.2 |
| D289,578 S | 4/1987 | Ruffin | D34/17 |
| 4,921,270 A | 5/1990 | Schoberg | 280/655.1 |
| 4,969,496 A * | 11/1990 | Romans | 144/286.5 |
| 5,201,536 A * | 4/1993 | Bono et al. | 280/30 |
| 5,224,531 A | 7/1993 | Blohm | 144/285 |
| 5,257,892 A | 11/1993 | Branch | 414/490 |
| 5,382,032 A | 1/1995 | Wilson | 280/30 |
| 5,479,840 A | 1/1996 | Hilliard et al. | 83/477.2 |
| 5,518,053 A | 5/1996 | Robison | 144/286.1 |
| 5,529,322 A | 6/1996 | Barton | 280/30 |
| 5,536,034 A | 7/1996 | Miller | 280/651 |
| 5,626,352 A | 5/1997 | Grace | 280/47.29 |
| 5,778,953 A | 7/1998 | Braddock | 144/286.1 |
| 5,863,052 A | 1/1999 | Roman | 280/30 |
| 5,941,543 A | 8/1999 | Kazmark, Jr. | 280/47.29 |
| 5,957,472 A | 9/1999 | Borgatti | 280/30 |
| 6,196,560 B1 * | 3/2001 | Ohlsson | 280/30 |
| 6,328,319 B1 * | 12/2001 | Stahler, Sr. | 280/47.18 |
| 6,345,829 B1 * | 2/2002 | Mueller | 280/47.18 |
| 6,360,797 B1 * | 3/2002 | Brazell et al. | 144/286.1 |
| 6,364,328 B1 * | 4/2002 | Stahler, Sr. | 280/47.18 |

FOREIGN PATENT DOCUMENTS

| | | |
|---|---|---|
| DE | 44 14 015 | 4/1994 |
| EP | 31414 * | 7/1981 |

* cited by examiner

Primary Examiner—Brian L. Johnson
Assistant Examiner—Bryan Fischmann
(74) Attorney, Agent, or Firm—Andrus, Sceales, Starke & Sawall, LLP

(57) ABSTRACT

A convertible apparatus for transporting and supporting a work tool at a work site. The apparatus includes a support frame extending along a longitudinal axis between a first end and a second end. A base member extends from the support frame in a direction perpendicular to the longitudinal axis of the support frame and stabilizes the support frame in its vertical, working position. A removable handle is attachable to the support frame for use in transporting the apparatus, the handle is also positionable on the base member and supports the work platform when the work platform is in its extended position. A primary wheel assembly is mounted to the support frame opposite the base member such that the primary wheel assembly and the base member stabilize the support frame in its vertical, working position.

26 Claims, 4 Drawing Sheets

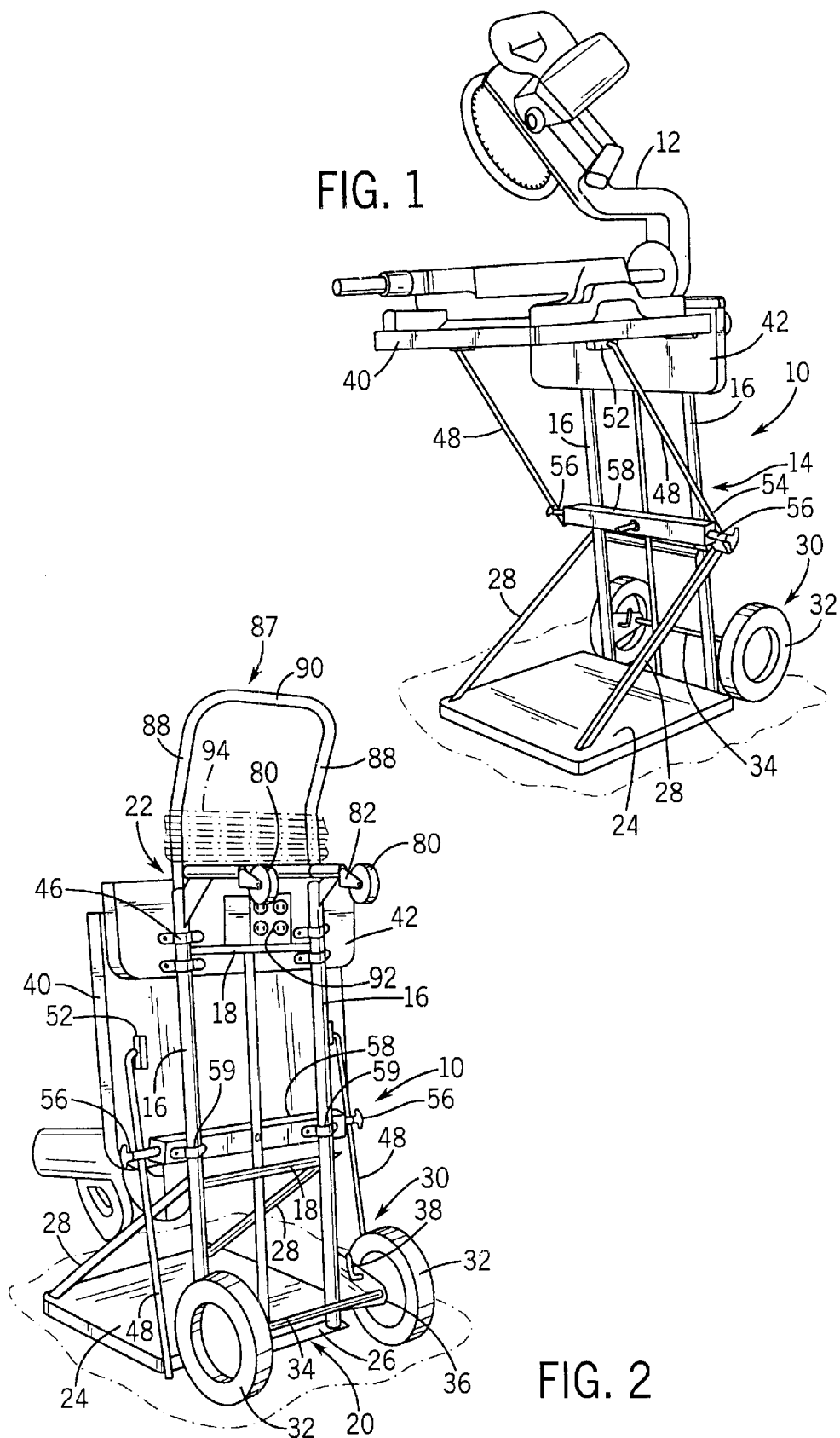

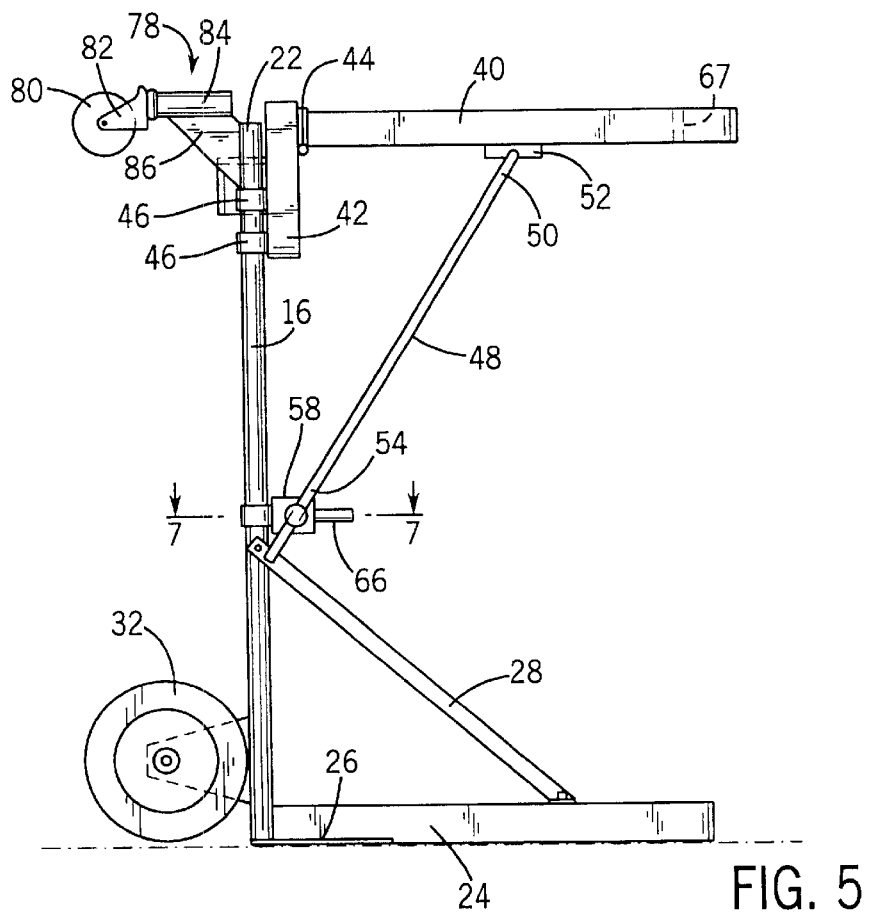
FIG. 5
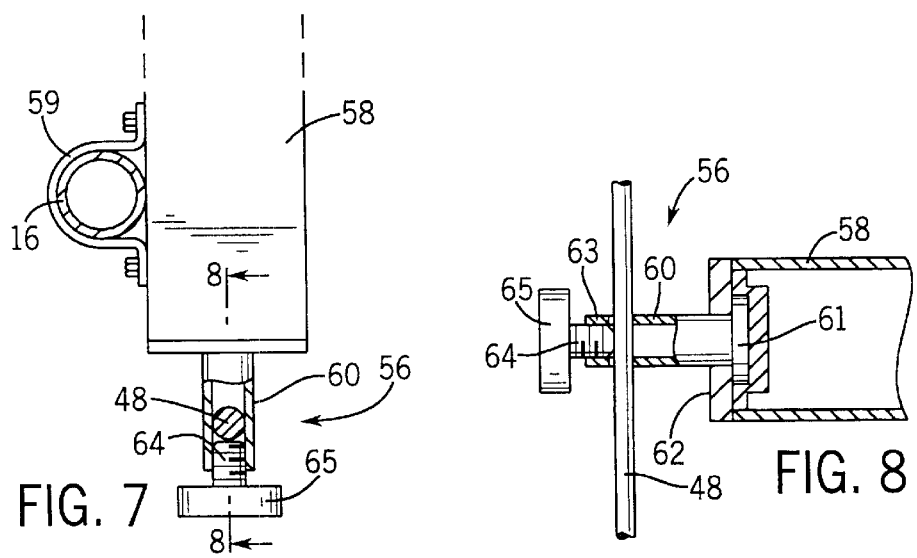
FIG. 7
FIG. 8

WORK TOOL TRANSPORTING AND SUPPORT APPARATUS

CROSS REFERENCE TO RELATED APPLICATION

This application is a continuation-in-part of U.S. patent application Ser. No. 09/571,433, filed May 15, 2000, now U.S. Pat. No. 6,345,829 issued Feb. 12, 2002.

BACKGROUND OF THE INVENTION

The present invention generally relates to an apparatus for manually transporting and supporting a work tool at a desired location at a work site. More specifically, the present invention relates to a convertible apparatus that has a removable handle to transport a work tool in a horizontal, transport position and that can be manipulated to support the work tool in an upright, working position.

Power tools, such as miter saws, sanders, table saws and grinders, are often needed to perform work operations in more than one location on a construction or work site. Since large power tools, such as those described above, are oftentimes large and cumbersome and have uneven weight distribution, transporting these work tools from one location at a work site to another, or from a vehicle to the work site, can be difficult. Often moving such work tools requires more than one worker or the use of a hand truck. When an upright hand truck is employed, the work tool is frequently supported on the toe plate of the hand truck in an unsecured manner, creating the potential for damage to the work tool if the work tool falls from the toe plate.

Once the work tool has been transported to the desired location at the work site, the work tool must be positioned in a convenient location for proper use. For example, it is desirable to have a work tool such as a miter saw or table saw positioned at least at waist height in order to ensure the ease of operation of the work tool. Proper support of the work tool can require that the work tool be placed on a level surface or be securely fastened to a table or machine stand. However, depending on the particular work site, these conditions may not be available and something less than ideal might have to be settled for. In either event, a worker must lift the work tool off of the hand truck and into the operating position, creating a risk of injury to the worker. The potential for injury is further increased if the work tool must be operated in a position that is less than ideal, as described above.

In addition to the problems associated with moving a work tool to the desired location at a work site, once the tool is no longer needed at the work site, the tool must be loaded into a work truck. Since the work tool is oftentimes heavy and cumbersome, more than one worker is again required to load the work tool onto the truck or other transportation device.

Therefore, it is an object of the present invention to provide a convertible transporting and supporting apparatus for use with a work tool. It is an additional object of the present invention to provide such an apparatus that is convertible between a working position and a transport position such that the apparatus and attached work tool can be both easily transported and functional in presenting the work tool at an acceptable operating height once at the work site. Further, it is an object of the present invention to provide a convertible apparatus that includes a removable handle that allows the handle to be used when the convertible apparatus is in both the horizontal, transport position and the vertical supportive working position.

SUMMARY OF THE INVENTION

The present invention is a new, alternative embodiment of a convertible apparatus that can be used to transport a work tool around a work site and can be converted into an upright, working position to support and position the work tool at a desired, usable height. The convertible apparatus includes a back, support frame that includes a pair of spaced support tubes each of which extend parallel to a longitudinal axis. The support frame of the convertible apparatus extends between a first end and a second end and forms the backbone of the apparatus.

The convertible apparatus includes a base member that extends from the first end of the support frame in a direction perpendicular to the longitudinal axis of the support frame. The base member contacts the ground to stabilize the convertible apparatus when the convertible apparatus is in its upright, working position. A pair of lower braces extend from opposite sides of the base member and are each attached to one of the support tubes of the support frame. The base members strengthen the perpendicular connection between the support frame and the base member such that the apparatus can support the weight of the work tool when the apparatus is in its upright, working position. A primary wheel assembly is mounted to the first end of the support frame opposite the mounting connection between the support frame and the base member. The primary wheel assembly aids in supporting the apparatus in the upright, working position and also allows the convertible apparatus to be transported for short distances when in the upright, working position.

When the convertible apparatus is in the horizontal, transport position, a secondary wheel assembly attached to the second end of the support frame supports the apparatus on the ground along with the primary wheel assembly. The secondary wheel assembly includes a pair of wheel tubes that extend perpendicular to the longitudinal axis of the support frame. Each of the wheel tubes is attached to one of the support tubes of the support frame by an angle bracket.

The convertible apparatus includes a work platform that is mounted to a mounting platform secured to the support frame. The work platform is pivotally mounted to the mounting platform and is movable between an extended position and a collapsed position. When the convertible apparatus is in its upright, working position, the work platform can be extended such that the work tool secured to the work platform is presented in the proper orientation for use by a worker.

The convertible apparatus includes a removable handle that is utilized to aid in transporting the apparatus when it is in its transport position and to aid in supporting the work platform when the work platform is in its extended position. When the handle is in the transport position, the handle is received within the wheel tubes of the secondary wheel assembly and thus extend perpendicular to the longitudinal axis of the support frame. When the apparatus is in the work position, the removable handle is placed onto a pair of support pegs positioned on the front end of the base member. A bracing member positioned on the front end of the work platform, subjacent to the work surface, interacts with a portion of a top cross bar of the removable handle to support the work platform in its extended position.

When the convertible apparatus is to be moved around the work site, the handle is removed from the support pegs and the work platform is moved from its extended position to its collapsed position. When the work platform moves to the collapsed position, a securing pin passes through a hole in the work platform to retain the work platform in its collapsed position. Once the work platform has been stabilized, the support frame is moved from the upright, working position to a horizontal, transport position and the handle is placed in the wheel tubes for transport.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a perspective view of a convertible apparatus for transporting and supporting a work tool in its vertical, working position;

FIG. 2 is a rear perspective view illustrating the convertible apparatus of the present invention in which the work platform and attached work tool are moved to the collapsed position;

FIG. 5 is a side view similar to FIG. 4 in which the work platform is in the extended, working position;

FIG. 7 is a partial section view taken along line 7—7 of FIG. 5 illustrating one of the locking devices used to secure the work platform in its extended position;

FIG. 8 is a section view taken along line 8—8 of FIG. 7;

DETAILED DESCRIPTION OF THE INVENTION

Figure 3:
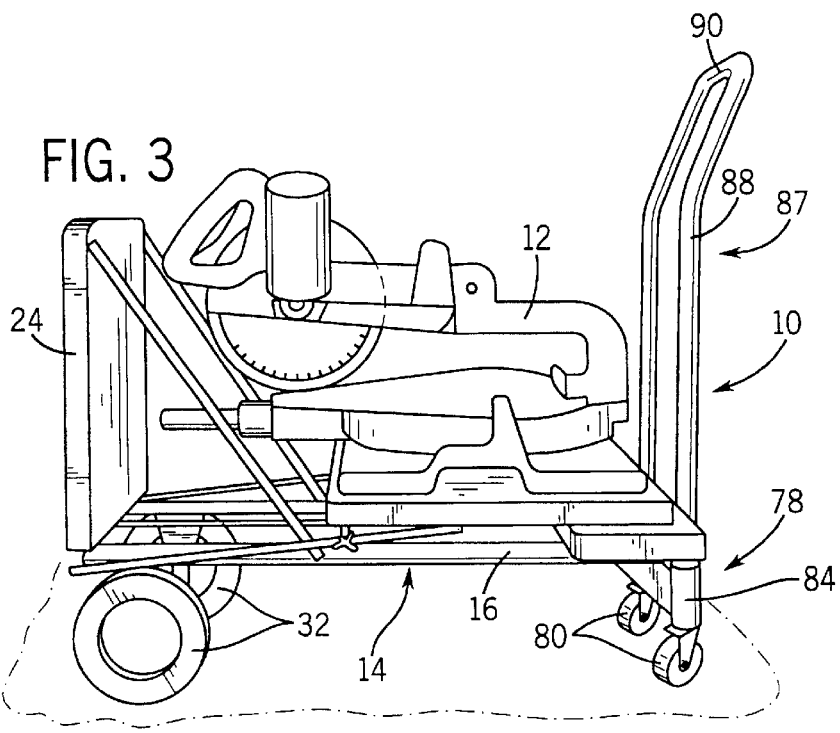
FIG. 3 is a perspective view of the convertible apparatus of the present invention in its horizontal, transport position.

Referring to FIGS. 1 and 2, thereshown is a convertible apparatus 10 for transporting and supporting a work tool 12. The convertible apparatus 10 of the present invention is generally convertible between an upright, vertical working position as shown in FIG. 1, which positions the work tool 12 at a convenient height, and a horizontal, transport position as illustrated in FIG. 3. When the convertible apparatus is in the transport position of FIG. 3, the work tool 12 can be easily moved around a construction site.

The convertible apparatus 10 includes a support frame 14 including a pair of spaced hollow support tubes 16 joined to each other by at least a pair of cross braces 18. The support frame 14 generally extends along a longitudinal axis between a first end 20 and a second end 22. As can be seen in FIG. 2, when the convertible apparatus 10 is in the upright, vertical working position, the first end of the support frame 14 is positioned in contact with the ground, while the second end 22 is approximately three feet above the ground.

Figure 4:
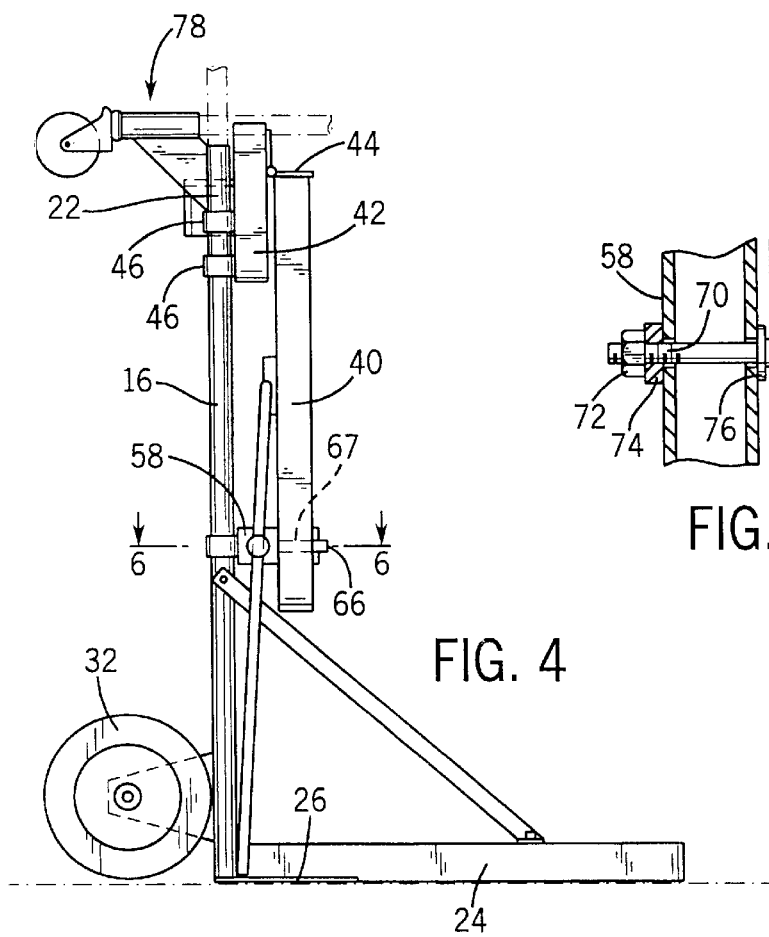
FIG. 4 is a side view illustrating the apparatus of the present invention in its vertical, working position and the work platform in its collapsed, transport position.

Referring back to FIG. 1, the convertible apparatus 10 includes a base member 24 that extends perpendicularly from the first end 20 of the support frame 14. Base member 24 is securely attached to a toe plate 26, which is in turn attached to the support frame 14, as best shown in FIGS. 4 and 5. The base member 24 is secured to the metallic toe plate 26 in any conventional manner, such as rivets or bolts. As can be understood in FIGS. 4 and 5, the base member 24 is substantially larger than the toe plate 26 and thus provides a substantially larger surface area that contacts the ground when the convertible apparatus 10 is in the upright, vertical working position as shown in FIGS. 1 and 2.

As can best be seen in FIGS. 1 and 4, a pair of brace members 28 extend between the top surface of the base member 24 and one of the support tubes 16 of the support frame 14. Each of the brace members 28 is formed from metal and has a generally L-shaped cross-section. The brace members 28 provide additional support for the support frame 14 when the convertible apparatus 10 is in the upright, working position of FIG. 1.

When the convertible apparatus 10 is in the upright, working position of FIGS. 1 and 2, a primary wheel assembly 30 contacts the ground along with the base member 24 to aid in supporting the convertible apparatus 10 in its upright position. The primary wheel assembly 30 includes a pair of wheels 32 each mounted to a wheel axle 34. The wheel axle 34 extends through a pair of mounting brackets 36, each of which are attached to one of the two support tubes 16. As can best be seen in FIG. 2, each of the mounting brackets 36 extends from the support frame 14 in a direction opposite to the base member 24.

The primary wheel assembly 30 includes a locking pin 38 that can be positioned to engage the wheel 32 to prevent the wheel 32 from rotating. The locking pin 38 is particularly useful to prevent the apparatus 10 from inadvertently moving when the convertible apparatus 10 is in its horizontal, transport position as shown in FIG. 3.

Referring back to FIG. 1, the convertible apparatus 10 of the present invention includes a work platform 40 that is pivotally movable between the extended position shown in FIG. 1 and the collapsed position shown in FIG. 2. The work platform 40 provides a surface to which the work tool 12 can be securely mounted. In FIGS. 1 and 3, the work tool 12 is a miter saw that is securely fastened to the work platform 40 by a series of conventional connectors. When the convertible apparatus 10 is in its upright, working position and the work platform 40 is in its extended position, the work tool 12 is positioned approximately three to four feet above the ground, which is a nearly ideal position for use by a worker.

Referring now to FIG. 4, the work platform 40 is attached to a mounting platform 42 by a hinge assembly 44. The hinge assembly 44 allows the work platform 40 to move from the collapsed position of FIG. 4 to the extended position of FIG. 5. The mounting platform 42 is connected between the pair of support tubes 16 by a series of metallic bands 46 and screw connectors, as best shown in FIG. 2. The mounting platform 42 provides a stable point of attachment between the work platform 40 and the support frame 14.

Referring now to FIGS. 4 and 5, the work platform 40 is supported in its extended position by a pair of braces 48. Each of the braces 48 has an upper end 50 journaled within a mounting bracket 52 attached to the bottom surface of the work platform 40. The lower end 54 of each of the braces 48 is received within a locking device 56, as seen in FIG. 1. The locking devices 56 extend from opposite sides of the support frame 14 and are mounted to the support frame 14 by a mounting block 58. As can be seen in FIG. 2, the mounting block 58 is secured between the pair of spaced support tubes 16 by a pair of metallic bands 59.

Referring now to FIGS. 7 and 8, each of the locking devices 56 includes a hollow body 60 attached to the mounting block 58. The hollow body 60 includes an expanded inner end 61 that is trapped behind an end plate 62 attached to the mounting block 58. The outer end 63 of the hollow body 60 is internally threaded and receives the threaded shaft 64 of the locking handle 65.

The brace 48 passes through an opening formed in the hollow body 60 such that the brace 48 is freely movable into and out of the hollow body 60. The threaded shaft 64 of the locking handle 65 includes an inner end that can be tightened into contact with the brace 48 passing through the hollow body 60. When the locking handle 65 is sufficiently tightened, the brace 48 is pressed into contact with the outer walls of the hollow body 60 such that the brace 48 is held in a stationary position. As can be understood in FIG. 1, when each of the braces 48 is locked into a stationary position, the braces 48 serve as supports to hold the work platform 40 in its horizontal, extended position.

If it is desired to move the work platform 40 from the extended position of FIG. 1 to the collapsed position of FIG. 2, the locking handles 65 are loosened to permit the braces 48 to freely move within the hollow body 60, as can be understood in FIGS. 7 and 8. When the locking handles 65 have been sufficiently loosened, the braces 48 can freely pass through the locking devices 56 and the work platform 40 can be lowered to the collapsed position. As can be understood in FIGS. 1 and 2, the overall weight of the work tool 12 must be supported by the braces 48 in order to prevent the work platform 40 from moving to the collapsed position shown in FIG. 2. Thus, the locking devices 56 are required to support the work platform 40 against the weight of the work tool 12.

Figure 6:
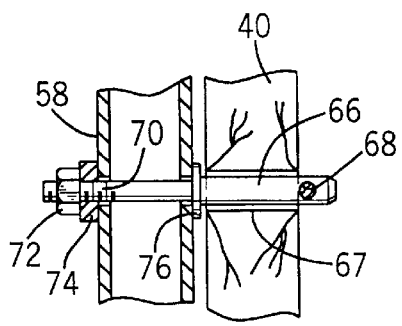
FIG. 6 is a partial section view taken along line 6—6 of FIG. 4 illustrating the securing pin used to secure the work platform in the collapsed position.

Referring now to FIGS. 5 and 6, the mounting block 58 includes a securing pin 66 that extends from the face of the mounting block 58. When the work platform 40 is moved to its collapsed position as shown in FIG. 4, the securing pin 66 passes through a hole 67 formed in the work platform, as best shown in FIGS. 4 and 6. Once the securing pin 66 has passed through the hole 67, a cotter pin 68 can be inserted through the outer end of the securing pin 66 to hold the work platform 40 in the collapsed position of FIG. 4. In this manner, the work platform 40 can be held in a secure position during transportation.

As can be seen in FIG. 6, the securing pin 66 includes a threaded portion 70 that receives a mating nut 72 and washer 74 to fix the securing pin 66 to the mounting block 58. A shoulder member 76 accurately positions the securing pin 66 on the mounting block 58 such that the correct length of the securing pin 66 extends through the hole 67 formed in the work platform 40.

Referring now to FIGS. 4 and 5, the convertible apparatus 10 further includes a secondary wheel assembly 78 mounted to the second end 22 of the support frame 14. The secondary wheel assembly 78 includes a pair of wheels 80 each mounted to a castor 82. The castors 82 allow the wheels 80 to rotate when the convertible apparatus 10 is in the horizontal, transport position of FIG. 3. Referring back to FIG. 5, each of the castors 82 and wheels 80 is mounted on a hollow wheel tube 84 that is joined to one of the support tubes 16 of the support frame 14 by an angle bracket 86. The angle bracket 86 is welded to both the support tube 16 of the support frame 14 and the wheel tube 84 of the secondary wheel assembly 78.

As can best be understood in FIG. 3, when the convertible apparatus 10 is in the transport position, the wheels 32 of the primary wheel assembly 30 and the wheels 80 of the secondary wheel assembly 78 contact the ground such that the convertible apparatus 10 can be easily moved around a work site.

As can be seen in FIG. 3, a handle 87 having a pair of side bars 88 joined by a cross bar 90 is attached to the convertible apparatus 10. Specifically, each of the side bars 88 are received in one of the wheel tubes 84 such that the handle 87 extends perpendicular to the longitudinal axis of the support frame 14. Thus, when the convertible apparatus 10 is in the horizontal, transport position, the handle 87 extends upward and the cross bar 90 can be grasped by the worker to push the convertible apparatus 10 around a work site.

Once the convertible apparatus has been moved to the desired position on the work site, the handle 87 is pulled out of the wheel tubes 84 and the convertible apparatus 10 is stood up to its vertical, working position as shown in FIG. 2. Once the apparatus 10 is in the vertical, working position, the side bars 88 of the handle 86 are inserted into the pair of spaced support tubes 16 of the support frame 14, as shown in FIG. 2. Once the handle 87 has been installed as shown in FIG. 2, the handle 87 can be used to move the convertible apparatus 10 around the work site supported by the pair of wheels 32 of the primary wheel assembly 30. The repositioning of the handle 87 allows the convertible apparatus 10 to be easily moved in both the vertical and the horizontal positions as shown in FIGS. 2 and 3.

As can be seen in FIG. 2, the convertible apparatus 10 further includes an electrical outlet box 92 mounted to the rear surface of the mounting platform 42. The electrical outlet box 92 includes a plurality of individual outlets that can receive electrical plugs from additional work tools. The electrical outlet box 92 includes a cord 94 that can be connected to a supply of electricity such that the electrical outlet box 92 can be electrified and used to power additional work tools at the work site.

New Alternative Embodiment

Figure 9:
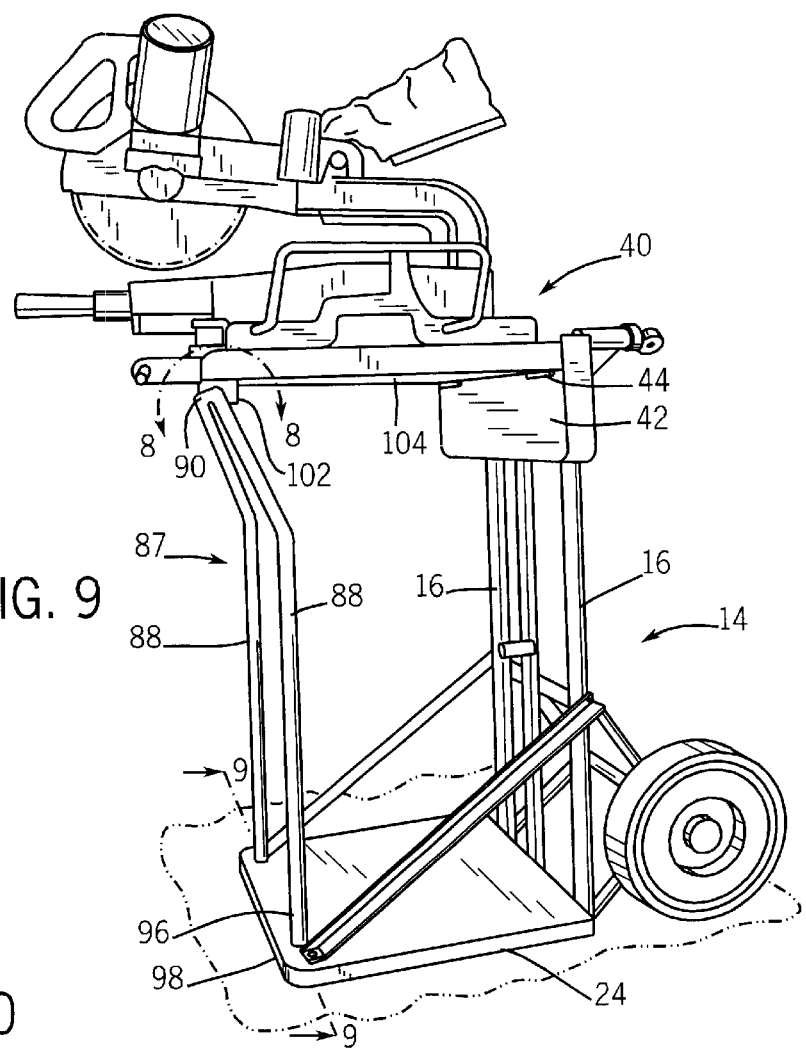
FIG. 9 is a perspective view of a new alternative embodiment of the convertible apparatus for transporting and supporting a work tool in its vertical, working position.
Figure 10:
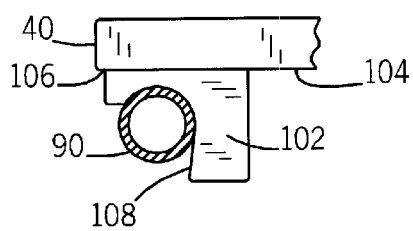
FIG. 10 is a partial section view taken along line 10—10 of FIG. 9 illustrating the interaction between the removable handle and the bracing member of the work platform.
Figure 11:
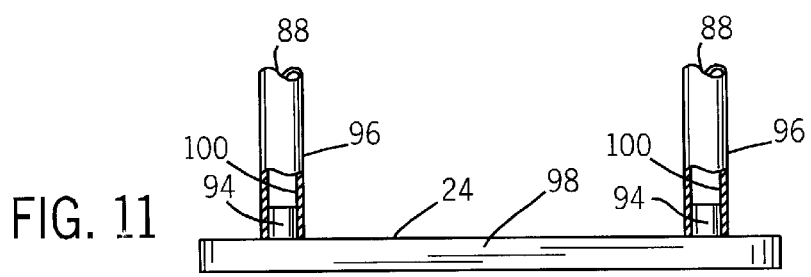
FIG. 11 is a partial section view taken along line 11—11 of FIG. 9 illustrating the support pegs used to position the removable handle in the working position.

FIGS. 9, 10 and 11 demonstrate the new preferred embodiment of the present invention. FIGS. 9–11 use like reference numerals from FIGS. 1–8 where appropriate to facilitate understanding. As can be seen from FIG. 9, the new alternative embodiment utilizes the handle 87 to support the work platform 40 in the working position.

As can be seen in FIG. 11, the handle 87 is movable to a support position in which the handle 87 is stabilized on the base member 24 by positioning the handle 87 onto a pair of support pegs 94. The side bars 88 of the handle 87 terminate in open, hollow ends 96. The support pegs 94 are situated on the base member 24 on a center line parallel to and laterally spaced from the front end 98 of the base member 24, and are spaced apart from one another at a distance equivalent to the distance between the side bars 88 of the handle 87. The support pegs 94 are shaped so that the open, hollow end 96 of the side bars 88 may be placed onto the support pegs 94 such that the support pegs 94 contact the inner edge 100 of the hollow end 96 of the handle 87. Thus, the handle 87 may be stabilized along the base member 24.

As can be seen in FIG. 10, in order for the handle 87 to support the work platform 40, a bracing member 102 is affixed to the bottom surface 104 of the work platform 40 near its front end. The bracing member 102 is designed to interact with the cross bar 90 of the handle 87. The bracing member 102 contains a top surface 106 which is attached to the bottom surface 104 of the work platform 40. The bracing member 102 further includes a contoured inner surface 108 designed to interact with the cross bar 90 of the handle 87. The inner surface 108 is contoured so that a substantial area of the cross bar 90 interacts with the inner surface 108 of the bracing member 102.

As evident from FIG. 9, when the user of the convertible apparatus desires to position the apparatus in the work position, the handle 87 is removed from the spaced support tubes 16 of the support frame 14. The hollow ends 96 of the handle 87 are then placed on the support pegs 94 such that the cross bar 90 of the handle 87 extends outwardly from the support frame 14. The work platform 40 is then positioned perpendicularly to the support frame 14 via the hinge assembly 44. The bracing member 102 is allowed to interact with the cross bar 90 to provide a secure support for the front end of the work platform 40. In this manner, the work platform 40 is securely supported by both the support frame 14 and the handle 87. By supporting the work platform in this manner, the force resulting from the weight of the tool on the work platform 40 is displaced down the handle 87, as well as down the support frame 14, allowing the force to be equally distributed.

Various alternatives and embodiments are contemplated as being within the scope of the following claims particularly pointing out and distinctly claiming the subject matter regarded as the invention.

I claim:

1. A convertible apparatus for transporting and supporting a work tool at a work site, the apparatus being convertible between a transport position and a working position, the apparatus comprising:
   a support frame extending from a first end to a second end along a longitudinal axis;
   a base member extending from the first end of the support frame, the base member being perpendicular to the longitudinal axis of the support frame, wherein the base member contacts the ground to stabilize the support frame when the support frame is in the working position;
   a work platform adapted to receive the work tool, the work platform being pivotally mounted to the support frame near the second end of the support frame, the work platform being movable between an extended position in which the work platform is perpendicular to the support frame and a collapsed position in which the work platform is parallel to the support frame; and
   a removable handle having a pair of substantially parallel side bars joined by a cross bar, the side bars being receivable within the support frame when the apparatus is in the transport position and supported on the base member when the apparatus is in the working position, wherein the handle supports the work platform when the work platform is in the extended position.

2. The apparatus of claim 1 further comprising:
   a primary wheel assembly mounted to the first end of the support frame opposite the base member, wherein the primary wheel assembly and the base member stabilize the apparatus when the apparatus is in the working position; and
   a mounting platform attached to the support frame, wherein the work platform is pivotally mounted to the mounting platform.

3. The apparatus of claim 1 wherein a pair of support pegs are positioned on a top surface of the base member to engage the handle.

4. The apparatus of claim 1 wherein a bracing member is affixed to the bottom surface of the work platform to engage the handle when the work platform is in the extended position.

5. The apparatus of claim 4 wherein the handle and the support frame are substantially parallel to one another when the apparatus is in the working position.

6. The apparatus of claim 4 wherein the work platform and the base member are parallel to each other when the apparatus is in the working position.

7. The apparatus of claim 6 wherein the work platform and the base member are perpendicular to the removable handle and the support frame when the apparatus is in the working position.

8. The apparatus of claim 6 wherein the force exerted on the work platform by the work tool is distributed substantially equally down the handle and the support frame when the apparatus is in the working position.

9. The apparatus of claim 2 further comprising a secondary wheel assembly mounted to the second end of the support frame, wherein the secondary wheel assembly and the primary wheel assembly support the apparatus when the apparatus is in the transport position.

10. The apparatus of claim 9 wherein the secondary wheel assembly includes a pair of hollow wheel tubes extending perpendicular to the longitudinal axis of the support frame, wherein when the apparatus is in the transport position, the handle is received within the wheel tubes for transport.

11. The apparatus of claim 1 further comprising a securing pin extending from the support frame, the securing pin being receivable within a hole formed in the work platform such that the securing pin is received within the hole in the work platform to retain the work platform in the collapsed position for transport.

12. A convertible apparatus for transporting and supporting a work tool at a work site, the apparatus being convertible between a transport position and a working position, the apparatus comprising:
   a support frame extending from a first end to a second end along a longitudinal axis the support frame including a pair of spaced support tubes;
   a base member extending from the first end of the support frame, the base member being perpendicular to the longitudinal axis of the support frame, wherein the base member contacts the ground to stabilize the support frame when the support frame is in the working position;
   a work platform adapted to receive the work tool, the work platform being pivotally mounted to the support frame near the second end of the support frame, the work platform being movable between an extended position in which the work platform is perpendicular to the support frame and a collapsed position in which the work platform is parallel to the support frame;
   a removable handle having a pair of substantially parallel side bars joined by a cross bar, the side bars being receivable within the support tubes of the support frame in the transport position and supported on the base member in the working position, wherein the handle supports the work platform when the work platform is in the extended position; and
   a primary wheel assembly mounted to the first end of the support frame opposite the base member, wherein the primary wheel assembly and the base member stabilize the apparatus when the apparatus is in the working position.

13. The apparatus of claim 12 wherein a pair of support pegs are attached to the base member, the support pegs being adapted to engage the handle such that the handle is stabilized on the base member.

14. The apparatus of claim 13 wherein a bracing member is affixed to a bottom surface of the work platform, the bracing member being adapted to engage a top cross bar of the handle such that the bracing member rests on the top cross bar of the handle to support the work platform when the handle is engaged with the support pegs and the work platform is in an extended position.

15. The apparatus of claim 14 wherein the support frame and the removable handle extend in parallel planes when the apparatus is in the working position and the handle is engaged with the support pegs and securely attached to the base member.

16. The apparatus of claim 12 further comprising a secondary wheel assembly mounted to the second end of the support frame, the secondary wheel assembly including a pair of spaced wheel tubes each having a secondary wheel member, wherein the pair of secondary wheel members and the primary wheel assembly support the apparatus when the apparatus is in the transport position.

17. The apparatus of claim 16 wherein the secondary wheel assembly includes a pair of hollow wheel tubes extending perpendicular to the longitudinal axis of the support frame, wherein the handle is received within the wheel tubes when the apparatus is in the transport position.

18. The apparatus of claim 12 further comprising a securing pin extending from the support frame, the securing pin being receivable within a hole formed in the work platform such that the securing pin is received within the hole in the work platform to retain the work platform in the collapsed position for transport.

19. A convertible apparatus for transporting and supporting a work tool at a work site, the apparatus being convertible between a horizontal, transport position and a vertical working position, the apparatus comprising:

a support frame extending along a longitudinal axis between a first end and a second end;

a base member extending from the first end of the support frame, the base member extending in a first direction perpendicular to the longitudinal axis of the support frame, wherein the base member contacts the ground to stabilize the support frame when the support frame is in the vertical working position, the base member including a pair of spaced support pegs;

a primary wheel assembly mounted to the first end of the support frame opposite the base member, wherein the primary wheel assembly and the base member support the apparatus when the apparatus is in the vertical working position;

a work platform adapted to receive the work tool, the work platform being pivotally mounted to the support frame near the second end of the support frame, the work platform being movable between an extended position in which the work platform extends in the first direction perpendicular to the support frame and a collapsed position in which the work platform is parallel to the support frame, the work platform including a bracing member affixed to the work platform; and a hollow, removable handle having a pair of parallel spaced side bars joined by a cross bar, the handle being movable between a stored position and a support position, wherein the side bars are received on the support pegs and the cross bar engages the bracing member to support the work platform when the handle is in the support position and the work platform is in the extended position.

20. The apparatus of claim 19 further comprising a secondary wheel assembly mounted to the second end of the support frame, the secondary wheel assembly including a pair of spaced wheel tubes each having a secondary wheel member, wherein the handle is received within the wheel tubes when the handle is in its stored position.

21. The apparatus of claim 19 wherein the side bars of the handle each include a hollow end, wherein each hollow end receives one of the support pegs to stabilize the handle on the base member when the handle is in its support position.

22. The apparatus of claim 19 wherein the bracing member includes a contoured, inner surface that engages the cross bar of the handle when the handle is in the support position.

23. A convertible apparatus for transporting a load, the apparatus convertible between a first transport position and a second transport position, and further convertible into a working position, the apparatus comprising:

a support frame extending from a first end to a second end along a longitudinal axis;

a base member extending from the first end of the support frame, said base member orientated perpendicular to the longitudinal axis of the support frame;

a primary wheel assembly mounted to the first end of the support frame opposite the base member, wherein the primary wheel assembly provides for movement of the apparatus in the first transport position and wherein the primary wheel assembly and the base member stabilize the apparatus in the working position;

a secondary wheel assembly mounted to the second end of the support frame, wherein the primary wheel assembly and the secondary wheel assembly support and provide for movement of the apparatus in the second transport position and wherein the secondary wheel assembly includes a pair of hollow wheel tubes extending perpendicular to the longitudinal axis of the support frame;

a removable handle receivable within the support frame in the first transport position, receivable within the hollow wheel tubes of the secondary wheel assembly in the second transport position, and supported by the base member in the working position; and a work platform mounted to the support frame near the second end of the support frame, wherein the work platform has a first load bearing position parallel to the longitudinal axis of the support frame in the second transport position, has a second load bearing position perpendicular to the longitudinal axis of the support frame in the working position, and has a support position parallel to the longitudinal axis of the support frame in the first transport position, and wherein the work platform engages the handle to support the work platform in the working position.

24. The apparatus of claim 23 wherein the base member is capable of bearing a load in the first transport position.

25. The apparatus of claim 23 wherein a work tool is fixedly attached to the work platform.

26. The apparatus of claim 23 wherein the handle comprises two parallel side bars and a cross bar and wherein the side bars are receivable within the support frame in the first transport position, are receivable within the hollow wheel tubes of the secondary wheel assembly in the second transport position, and are supported by the base member in the working position, and wherein the cross bar provides support to the work platform in the working position.

* * * * *